(12) United States Patent
Platner

(10) Patent No.: US 7,568,286 B2
(45) Date of Patent: Aug. 4, 2009

(54) METHOD OF FORMING A TUBULAR AXLE

(75) Inventor: David K. Platner, Shelby, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 1737 days.

(21) Appl. No.: 10/056,945

(22) Filed: Oct. 25, 2001

(65) Prior Publication Data

US 2003/0037426 A1 Feb. 27, 2003

Related U.S. Application Data

(63) Continuation-in-part of application No. 09/935,026, filed on Aug. 22, 2001, now abandoned.

(51) Int. Cl.
*B21D 53/90* (2006.01)
(52) U.S. Cl. .................. 29/897.2; 72/370.14; 72/368; 72/370.24; 72/370.26
(58) Field of Classification Search ............... 29/897.2, 29/897.312, 897.3, 421.1; 72/57, 58, 61, 72/62, 367.1, 368, 370.01, 370.06, 370.1, 72/370.14, 370.23, 370.24, 370.26
See application file for complete search history.

(56) References Cited

U.S. PATENT DOCUMENTS 5,662,349 A * 9/1997 Hasshi et al. ......... 280/124.134
6,070,445 A * 6/2000 Holierhoek ................ 72/61
6,122,948 A * 9/2000 Moses ...................... 72/61
6,230,540 B1 * 5/2001 Wilch et al. ............ 72/370.1
6,247,346 B1 * 6/2001 Dickson, Jr. ......... 72/370.13
6,305,430 B1 * 10/2001 Ishikawa ................. 138/174

FOREIGN PATENT DOCUMENTS

| JP | 52-57624 | 5/1977 |
|---|---|---|
| JP | 55-119503 | 9/1980 |
| JP | 02-041903 | 2/1990 |
| JP | 06-226339 | 8/1994 |

* cited by examiner

*Primary Examiner*—T. Nguyen
(74) *Attorney, Agent, or Firm*—Carlson, Gaskey & Olds PC

(57) ABSTRACT

A method of forming an axle assembly having a hollow member. A hollow member such as a cylindrical tube is formed into a polygonal cross-section having an end portion. Bulkheads maybe located into the hollow member prior or after the polygonal forming step to improve proximate strength and transfer suspension bending moments. The end portions are formed to receive a preformed king pin boss having an end portion of approximately the same size as the frustoconical end. The members are welding together and the king pin and hollow member are bent to a desired axle shape. In another method sequence, the kingpin boss is directly formed into the end of the hollow member.

5 Claims, 1 Drawing Sheet

METHOD OF FORMING A TUBULAR AXLE

The present application is a continuation-in-part of U.S. application Ser. No. 09/935,026, filed Aug. 22, 2001 now abandoned.

BACKGROUND OF THE INVENTION

The present invention relates to an axle having a hollow section, and more particularly to a method of forming a complete axle from a singular tubular member.

Front axles are typically constructed from a forged I-beam, which is suitable for bending loads but typically not ideal for torsional and other loads. Tailoring of the I-beam to a desired application is typically limited to varying the overall beam size and flange thickness. Variation of the flanged thickness relative to the inter-flange section along a single member is complicated and may provide only limited weight and strength versatility. Hollow tubular members have also been used to lighten axle assemblies and improve torsional loading characteristics. Typically, rectangular or cylindrical tube sections are welded to other preformed axle portions such as goose necks. Goose necks receive king pins to provide the pivotal attachment for steering knuckles, which support the vehicle wheels. Disadvantageously, this sectional component approach is expensive, may be difficult to control and typically results in a relatively heavy axle assembly.

Accordingly, it is desirable to provide a versatile method of forming a lightweight axle assembly having a hollow section without the necessity of welding multiple axle segments together.

SUMMARY OF THE INVENTION

The forming method according to the present invention provides a versatile method of forming a hollow axle assembly. A hollow member such as a cylindrical tube is formed into a polygonal cross-section having an end portion. Bulkheads may be located into the hollow member prior or after this polygonal forming step to improve proximate strength and transfer suspension bending moments. The end portions are formed to provide round or frustroconical portions to receive a preformed king pin boss. The members are welded together and the king pin boss and tubular member are bent to a desired axle shape. The axle may then be processed by heat treating, quenching, and tempering. Straightening of the axle may also be desirable.

In another method sequence, the frustroconical end is formed directly to the hollow member prior to forming the tubular member into a polygonal cross-section member.

In another method sequence, the bending step is performed prior to attachment step when the preformed king pin boss does not need to be separately bent.

In another method sequence, the king pin boss is directly formed into the end of the tubular member by upsetting or downsizing. No welding is required. After forming the king pin boss, the tubular member may then be formed into a polygonal cross-section member or bent as desired.

The present invention therefore provides multiple method sequences resulting in maximum manufacturing versatility. The axle assembly formed according to the present invention provide an integral hollow section which lightens the axle and provides desirable bending and torsional loading characteristics. Axle assemblies manufactured according to the present invention have demonstrated increased strength while reducing weight from approximately 185 pounds to 110 pounds.

BRIEF DESCRIPTION OF THE DRAWINGS

The various features and advantages of this invention will become apparent by reference to the following detailed description when considered in connection with the accompanying drawing wherein the FIGURE is a flowchart of the present invention forming process depicting the axle at its various forming stages.

DETAILED DESCRIPTION OF THE PREFERRED EMBODIMENT

Figure 1:
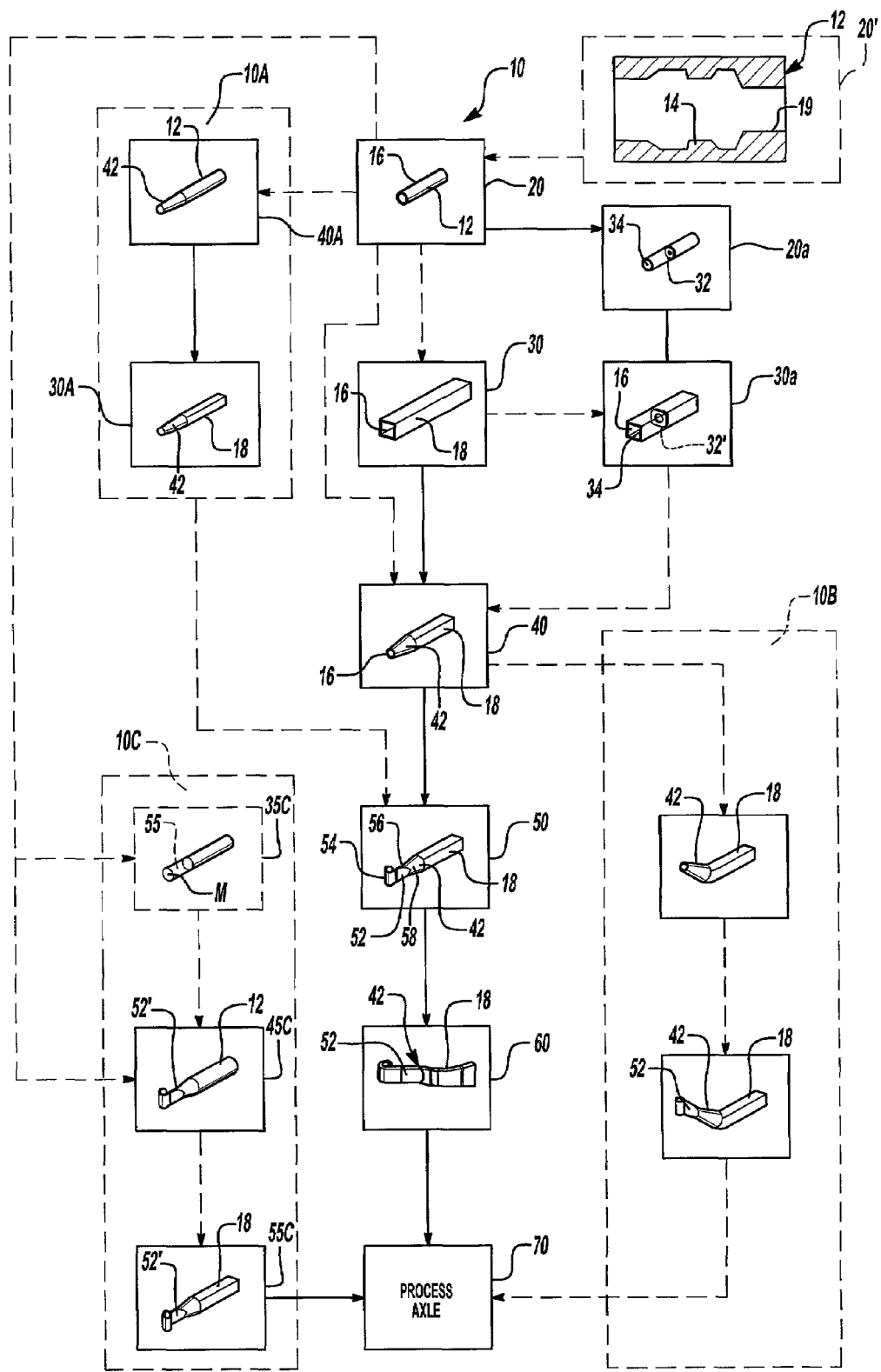

FIG. 1 illustrates a flow chart of the present invention axle forming process 10. The process 10 is initiated with a hollow member 12. Preferably, the hollow member 12 is preferably a cylindrical tubular member 12 as indicated at step 20, but may also be a polygonal member as indicated in step 30. It is to be understood that swaging is a preferred method of forming, however other methods may be used to form the hollow member 12. Although clearly not limited to only such sizes, a $3/8^{th}$ inch wall thickness tube is provided to carry approximately 12,000 pounds; $9/16^{th}$ inch wall thickness tube is provided to carry approximately 14,600 pounds; and $3/4^{th}$ inch wall thickness tube is provided to carry approximately 18,000 pounds after the process sequence of the present invention.

Furthermore, the tubular member 12 may alternatively include preformed multi-wall thickness lengths 14 as indicated at step 20'. By providing multi-wall thickness lengths 14, the tubular member 12 includes predetermined increased strength sections along desired lengths and lighter thinner sections along other lengths to provide multiple advantages.

The tubular member 12 includes an end 16. It should be understood that although the present invention will be described with regard to only one end, the present invention is preferably applied to each end of a tubular member to form a complete axle from a single piece of hollow stock. The tubular member 12 is formed into a polygonal cross-section member 18 as indicted in step 30. It should be understood that only predetermined lengths may be formed into the polygonal cross-section depending upon the desired application. Preferably, a substantially rectangular cross-section having a height to width ratio of approximately 1.2 is provided for an axle application, however, other sections will also benefit from the present invention.

Alternatively or in addition, a substantially crushable bulkhead 32 may be inserted into a cavity 34 within the tubular member 12 as indicated at step 20a. The crushable bulkhead 32 is then simultaneously formed into a polygonal bulkhead 32' at step 30 when the tubular member 12 is formed into the polygonal cross-section member 18. The bulkhead is thereby locked into the hollow member. The bulkhead 32, 32' improves the proximate strength of the hollow member 12, 18, provides a mounting area for other axle components and efficiently transfers suspension bending moments into axle torsional shear. Alternatively or in addition, the bulkhead may be formed as a polygonal bulkhead 32' which is located in the polygonal cross-section member 18 after formation as indicated as step 30a.

The end 16 of the polygonal member 18 is formed, preferably by a stamping, rolling, swaging, or pointing process, to provide a generally circular or frustoconical end 42 that is reduced in size relative to the hollow member 12 as indicated at step 40. Preferably, the end 16 is reduced to receive a desired end component. commonly a preformed king pin boss 52. Other forming methods and shapes will also benefit.

The preformed king pin boss 52 provides a pivotal connection 54 and a substantially rounded end 56 for attachment to the frustroconical end 42 as indicated in step 50. The pivotal connection 54 provides a circular boss to receive the king pin. The substantially rounded end 56 mates with a generally circular end 58 of the frustoconical end 42 to provide an effective welding surface. Attachment is preferably by welding or the like. By providing substantially rounded mating surfaces friction welding particularly benefits from the present invention.

After the attachment step 50, the polygonal cross-section member 18 and the king pin boss 52 may be bent to a desired shape, such as a known gooseneck shape, as indicated at step 60. Bending the members 18, 52 may yield a trapezoidal cross-sectional in the frustoconical area 42. Step 60 results in an axle assembly of the generally desired shape.

The axle may then be processed in any manner commonly used as indicated at step 70. In particular, the axle maybe heat treated in a furnace and then quenched. The axle may then be tempered and straightened, if necessary.

Referring to alternative path 10A, the frustoconical end 42 is formed directly to the hollow member 12 as indicated at step 40A prior to the forming the tubular member 12 into a polygonal cross-section member 18 as indicted in step 30A. Such a sequence may be preferred when certain axle lengths require a round cross-section and it is preferable to form the polygonal-lengths later in the process.

Referring to alternative path 10B, the bending step 60 may also be performed prior to attachment step 50 as indicated by the illustrated alternative method path. Such a sequence may be preferred when the preformed king pin 52 need not to be separately bent.

Referring to alternative method path 10C, the king pin 52' is directly formed as indicated in step 45C. That is, the end 14 of the tubular member 12 is directly formed into the general kin pin 52' shape by upsetting or downsizing the end 14 of the tubular member 12. A substantially solid material insert 55 may be inserted into the end 14 at step 35C to provide additional working material to form the king pin 52' prior to step 45C. After step 45C, the tubular member 12 may then be formed into the polygonal cross-section member 18 as indicted in step 55C and then bent as desired as indicated in step 65C. Of course, these steps may be additionally or alternatively sequenced as other wise described above.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of forming an axle assembly comprising the steps of:
   a) providing a cylindrical hollow member having an end portion;
   b) forming the end portion to provide a first generally circular end in cross-section,
   c) forming a section of the cylindrical hollow member into a polygonal cross-section section;
   d) welding a preformed kingpin boss to the generally circular end; and
   e) swaging the polygonal cross-section section into a generally frustoconical shape subsequent to said step c).

2. The method according to claim 1, wherein said step a) further comprises:
   providing the cylindrical hollow member with a preformed multi-wall thickness section.

3. The method according to claim 1, wherein said step c) further comprises:
   forming the polygonal cross-section section into a substantially rectangular cross-section section.

4. The method according to claim 1, wherein said step c) further comprises:
   forming the polygonal cross-section section into a substantially rectangular cross-section having a height to width ratio of approximately 1.2.

5. The method according to claim 1, wherein said step d) is performed subsequent to said step c).

* * * * *

UNITED STATES PATENT AND TRADEMARK OFFICE
CERTIFICATE OF CORRECTION

| | |
|---|---|
| PATENT NO. | : 7,568,286 B2 |
| APPLICATION NO. | : 10/056945 |
| DATED | : August 4, 2009 |
| INVENTOR(S) | : David K. Platner |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1715 days.

Signed and Sealed this

Seventh Day of September, 2010

David J. Kappos
*Director of the United States Patent and Trademark Office*